US008712986B2

(12) United States Patent  (10) Patent No.: US 8,712,986 B2
Sidlosky et al.  (45) Date of Patent: Apr. 29, 2014

(54) METHODS AND SYSTEMS PROVIDING DESKTOP SEARCH CAPABILITY TO SOFTWARE APPLICATION

(75) Inventors: Jeffrey Alan Joseph Sidlosky, San Jose, CA (US); Creighton W. Chong, Fremont, CA (US)

(73) Assignee: IAC Search & Media, Inc., Oakland, CA (US)

( * ) Notice: Subject to any disclaimer, the term of this patent is extended or adjusted under 35 U.S.C. 154(b) by 1650 days.

(21) Appl. No.: 11/061,225

(22) Filed: Feb. 18, 2005

(65) Prior Publication Data

US 2006/0190429 A1  Aug. 24, 2006

Related U.S. Application Data

(60) Provisional application No. 60/560,430, filed on Apr. 7, 2004.

(51) Int. Cl.
*G06F 7/00* (2006.01)
*G06F 17/30* (2006.01)

(52) U.S. Cl.
USPC ............................ 707/706; 707/722; 707/736

(58) Field of Classification Search
USPC .............. 707/3, 1, 6, 503; 345/356, 348, 357, 345/156, 173; 715/513
See application file for complete search history.

(56) References Cited

U.S. PATENT DOCUMENTS

| | | | | |
|---|---|---|---|---|
| 5,252,951 A | * | 10/1993 | Tannenbaum et al. | 345/156 |
| 5,870,740 A | * | 2/1999 | Rose et al. | 707/5 |
| 6,141,010 A | * | 10/2000 | Hoyle | 715/854 |
| 6,847,959 B1 | * | 1/2005 | Arrouye et al. | 707/2 |
| 2002/0062312 A1 | * | 5/2002 | Gupta et al. | 707/3 |
| 2002/0129054 A1 | * | 9/2002 | Ferguson et al. | 707/503 |
| 2003/0101413 A1 | * | 5/2003 | Klein et al. | 715/513 |
| 2004/0249801 A1 | * | 12/2004 | Kapur | 707/3 |
| 2005/0149932 A1 | * | 7/2005 | Hasink et al. | 718/100 |
| 2005/0234848 A1 | * | 10/2005 | Lawrence et al. | 707/1 |
| 2006/0112130 A1 | * | 5/2006 | Lowson | 707/102 |

OTHER PUBLICATIONS

"Enablement of Presentation Manager Message Box Subclasses", IBM TDB, Mar. 1995, vol. 38, No. 3.*

* cited by examiner

*Primary Examiner* — Mariela Reyes
*Assistant Examiner* — Hexing Liu
(74) *Attorney, Agent, or Firm* — Stephen M. De Klerk

(57) ABSTRACT

Methods and apparatuses for providing an Internet (Web) search functionality to a target application. The Web functionality allows a target application to access and use the Web search functionality without modification of the target application. For one embodiment, information communicated between the target application and the operating system, or other applications, is intercepted and evaluated. A determination is made as to whether or not to implement the Web search functionality within the target application based upon the intercepted information. For one embodiment of the invention, a Web search capability is implemented with applications to which such capability is deemed beneficial. For one embodiment of the invention, the added Web search functionality automates the process of saving selected web content to the user's personal computer, locating the saved Web content on the personal computer, and appending the saved content into the target application product.

22 Claims, 7 Drawing Sheets

METHODS AND SYSTEMS PROVIDING DESKTOP SEARCH CAPABILITY TO SOFTWARE APPLICATION

CLAIM OF PRIORITY

This application is related to, and hereby claims the benefit of provisional application No. 60/560,430, entitled "Software and Method for Delivery Integrated Search and Information Organization Capability to Computer Applications" which was filed Apr. 7, 2004.

FIELD

Embodiments of the invention relate generally to the field of software applications and more specifically to providing additional functionality to software applications.

BACKGROUND

The capability of organizing information has grown along with the ever-increasing availability of information. A typical software application for organizing stored information on a personal computer (e.g., laptop, desktop, etc.), organizes the information as multiple files within each of multiple directories. Typically, a user may have hundreds or even thousands of files organized within scores of directories. Such files may contain text entered from a keyboard, or other types of electronic files including pictures, executable programs, sounds, videos or any type of binary file.

To facilitate locating and accessing this information, desktop search functionality has been developed. Such functionality may be implemented as an independent search application or as part of an application for which search functionality is deemed beneficial. For example, a word processing application may provide search functionality so that stored information may be located and incorporated into a document created using the word processing application.

Disadvantages arise when a particular application does not provide functionality that would benefit the application. For example, some e-mail messaging applications do not provide a search capability within the application itself. For such e-mail messaging applications, when a user wishes to attach a file to an e-mail message, the user must know the location of the file to be attached. That is, typically, when the attach file functionality is initiated, the user is presented with a file dialog box, the user must then navigate through the various drives, directories, sub-directories, and files to locate the desired file. This is time-consuming and often futile if the user is not aware of the particular drive, directory, and file name of the desired file.

Even where the application provides desired functionality, the functionality provided may not be as effective as an independent application providing such functionality. For example, where search capability is provided in a word processing application the search capability provided is often not as effective as an independent search application. Therefore the user of such a word processing application may not be able to take advantage of improvements in search capability.

There are many reasons for this including the development time for more complex applications. That is, an application may take months or years to develop. During this time, particular functionality provided by the application may have become obsolete, or an independent application that provides superior functionality has been developed. It is not practical at that point to revise the application to incorporate the superior functionality. Moreover, the superior functionality is often developed independently of the manufacturer of the application. Such manufacturers are reluctant to incorporate independent functionality (even superior functionality) within their products.

For example, a vast source of available information may be found on internet-related networks (e.g. the World Wide Web (Web)) or other Internet sources and Internet search functionality is available. However, Internet search capability is not provided within many applications that would benefit from such functionality. For example, consider a user of a word processing application or an e-mail messaging application who wishes to search the Web for particular information and incorporate that information into their document or e-mail message. Such a user must initiate an independent Web search functionality, obtain the desired information, through, for example, a copy operation, and incorporate the desired information into their document or e-mail message, through for example, a paste, attach, or append operation. This interaction between the user and the several applications is time-consuming and prone to error.

The disadvantages described above in reference to the implementation of search capability (desktop or Internet) in relation to word processing applications or e-mail messaging applications are equally applicable to a wide variety of applications and functionality. Thus, in general, personal computers provide a number of software applications each of which provide various functionality. Such applications often lack specific functionality that may be beneficial in the context of the application; or provide substandard functionality of a specific type. Due to the fact that applications are produced by various manufacturers, it may not be possible or practical for a manufacturer to incorporate specific functionality (or optimum functionality) within a given application.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Embodiments of the invention provide the methods and apparatuses for adding functionality to applications without modifying the applications. For one embodiment of the invention, software providing a specific functionality is implemented at the operating system level and allows a target application to access and use the functionality without modification of the application. For one such embodiment, additional functionality software (AFS) intercepts information communicated between the application and the operating system (or other applications), and based upon this intercepted information, provides specific functionality to the application. The functionality provided may replace or augment the existing functionality of the target application.

For one embodiment of the invention, a search capability is provided to specific applications to which such capability is deemed beneficial (e.g., word processing applications and e-mail messaging applications). For one such embodiment, the search capability includes desktop search capability as well as Internet (Web) search capability.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

This overview represents some inventive features of various embodiments, which may contain any one of these features alone or in combination. This overview is provided to facilitate the understanding of specific embodiments of the invention discussed below in reference to FIGS. 1-7. This overview does not summarize the invention, nor is it intended to be a summary.

Process

Figure 1:
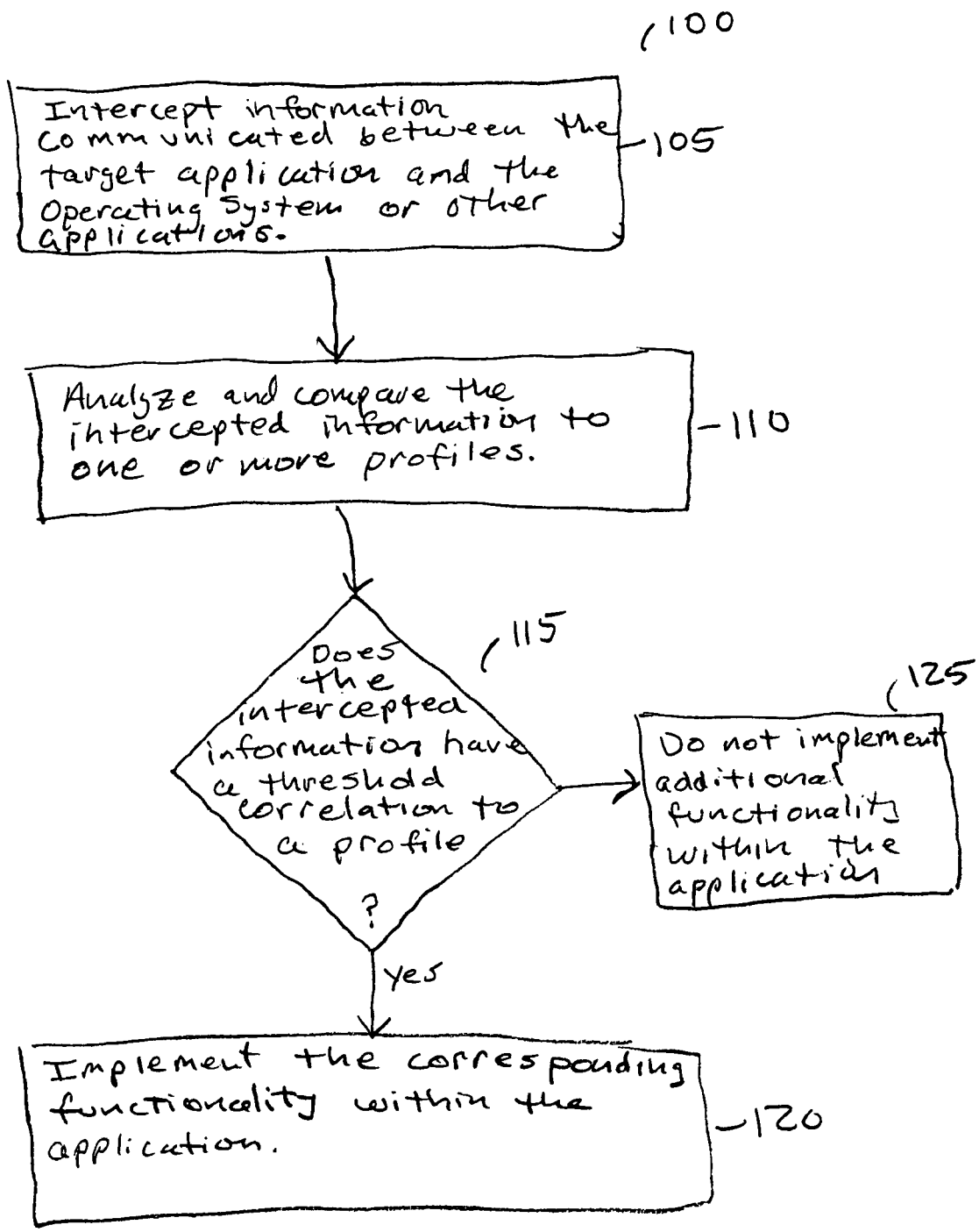
FIG. 1 illustrates a process in which a determination is made to provide functionality to an application in accordance with one embodiment of the invention.

FIG. 1 illustrates a process in which a determination is made to provide functionality to an application in accordance with one embodiment of the invention.

Process 100, shown in FIG. 1, begins with operation 105 in which information communicated between the target application and the operating system (OS) or other applications is intercepted by the AFS.

At operation 110, the AFS analyzes the intercepted information and compares the intercepted information to one or more profiles. Each profile corresponds to specific functionality that is deemed beneficial to particular applications.

At operation 115 if the intercepted information has a threshold correlation to a profile, then the corresponding functionality is implemented within the target application at operation 120.

If, at operation 115, the intercepted information does not have a threshold correlation to a profile, then a determination is made not to implemented additional functionality within the target application at operation 125.

Figure 2:
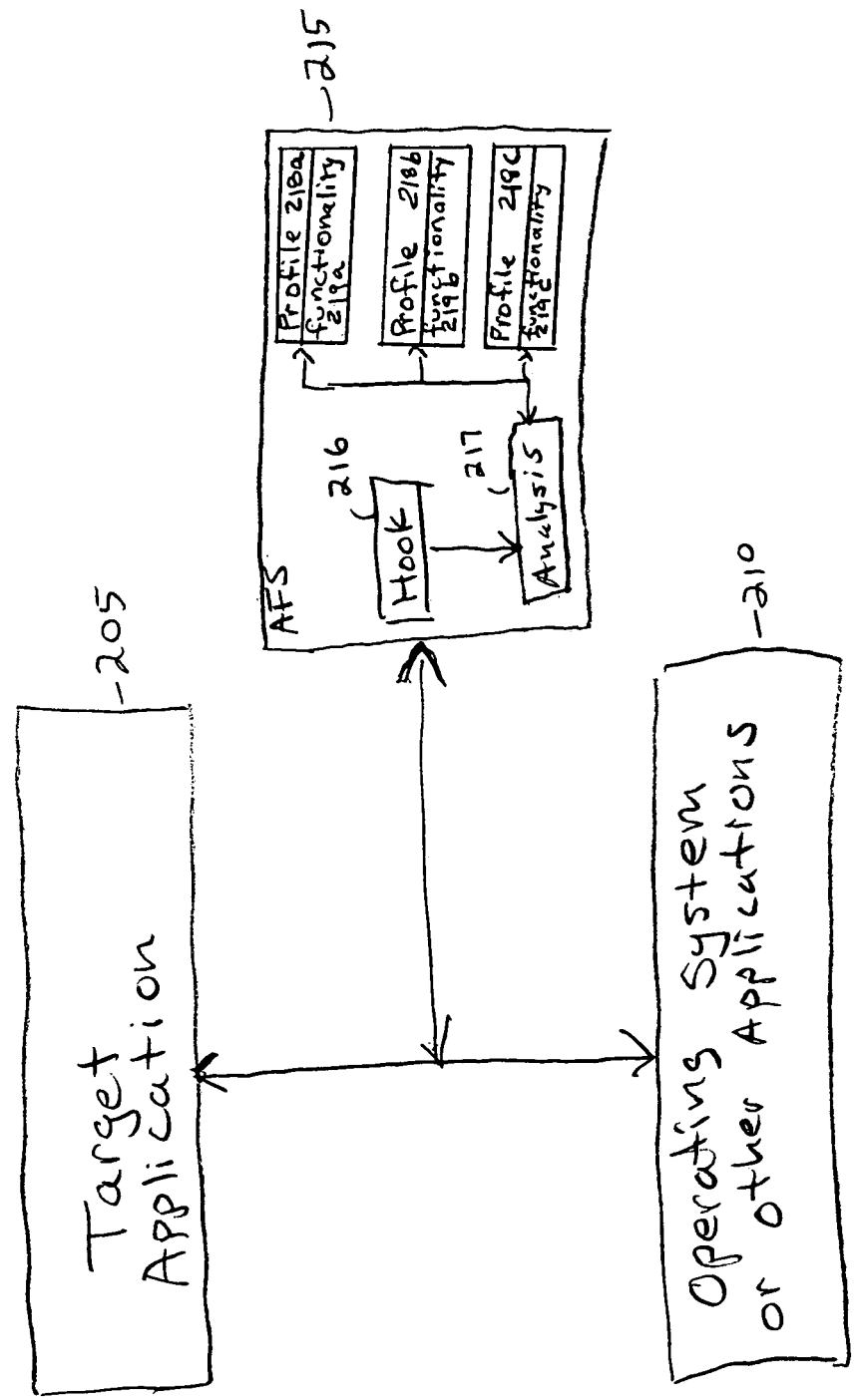
FIG. 2 illustrates a block diagram of software interaction in accordance with one embodiment of the invention.

FIG. 2 illustrates a block diagram of a software system in accordance with one embodiment of the invention. System 200, shown in FIG. 2, may be implemented on any convention digital processing system (DPS), and includes a target application 205, an OS (or other applications) 210 and an AFS 215.

As shown in FIG. 2, information is communicated between the target application 205 and the OS or other applications 210. The AFS 215 uses a hook 216 to intercept the information communicated between the target application 205 and the OS or other applications 210. The AFS 215 includes an analysis functionality 217 to compare the intercepted information to one or more profiles, shown for example as profiles 218a-218c. Each profile has corresponding functionality, shown for example as functionalities 219a-219c.

The analysis functionality 217 compares the intercepted information to one or more of the profiles 218a-218c. Upon a determination that the intercepted information has a threshold correlation to a profile, the AFS 215 implements the functionality corresponding to that profile within the target application 205. For example, if upon analysis of the intercepted information, a determination is made that the intercepted information has a threshold correlation with profile 218b, then, the AFS 215 will implement the corresponding functionality (i.e., functionality 219b) within the target application 205.

For one embodiment of the invention, the profiles are disjoint such that intercepted information having a threshold correlation to one profile would not have a correlation to any of the other profiles. In an alternative embodiment of the invention the profiles are not disjoint. For such an embodiment, functionality corresponding to each profile for which the intercepted information has a threshold correlation is implemented within the target application.

Exemplary Embodiment

Embodiments of the invention are applicable to a wide range of applications and functionality. For purposes of illustration an exemplary embodiment of the invention implementing a search capability within an application is described in greater detail below.

Figure 3:
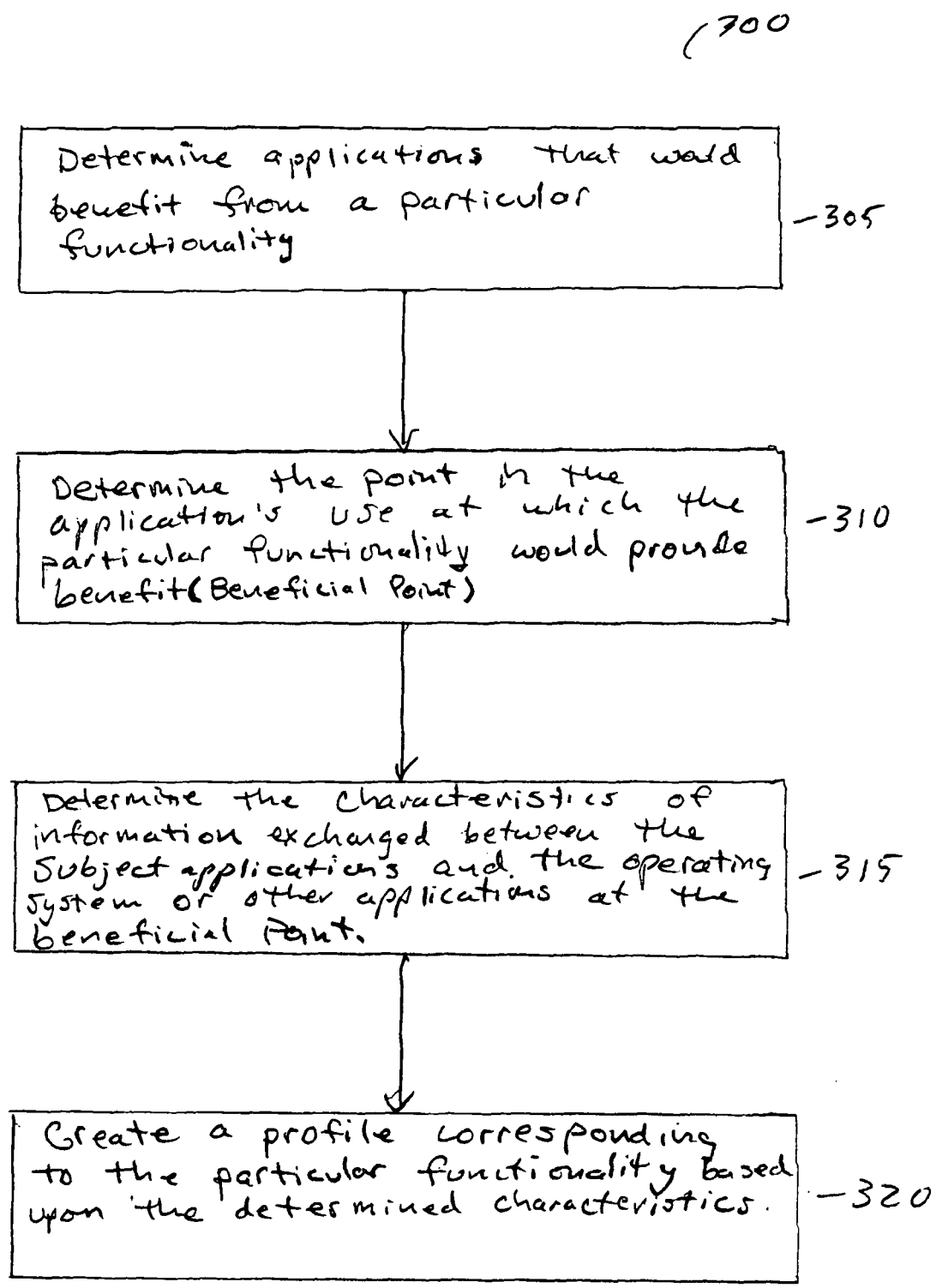
FIG. 3 illustrates a process in which a profile corresponding to search functionality is determined in accordance with one embodiment of the invention.

FIG. 3 illustrates a process in which a profile corresponding to search functionality is determined in accordance with one embodiment of the invention. Process 300, shown in FIG. 3, begins at operation 305 in which a determination is made as to which applications will benefit from the particular functionality (subject applications). Search capability, for example, will benefit word processing applications and e-mail messaging applications among others.

At operation 310, the point in the application's use at which the particular functionality will provide the prospective benefit is determined. For example, search capability will allow the user to quickly locate information to be inserted into a word processing document or attached to an e-mail message. Therefore, the point in the application's use at which search capability would be beneficial (beneficial point) is when the user is inserting or attaching information.

At operation 315, the characteristics of the information communicated between the subject applications and the OS or other applications, at the beneficial point is determined. For example, word processing applications that allow a user to insert information typically provide a dialog box having a set of basic buttons (clickable command shortcuts) which may include "OK", "cancel", "insert", and "submit". The dialog box also typically includes a directory list and an edit box labeled "file name" with a cursor and an edit box labeled "file type". E-mail messaging applications typically have similar a similar set of buttons, which may include an "attach", as well as similar features. Another characteristic of such dialog boxes is that they are typically of dimensions of approximately 100 pixels wide or greater.

Characteristics of the communicated information that may be considered relevant may also include items (e.g., buttons, icons, dimensions, etc) that typically would not be included in a dialog box of a word processing application of e-mail messaging application. For example, the characteristic of having more than seven buttons may be considered relevant.

Figure 4:
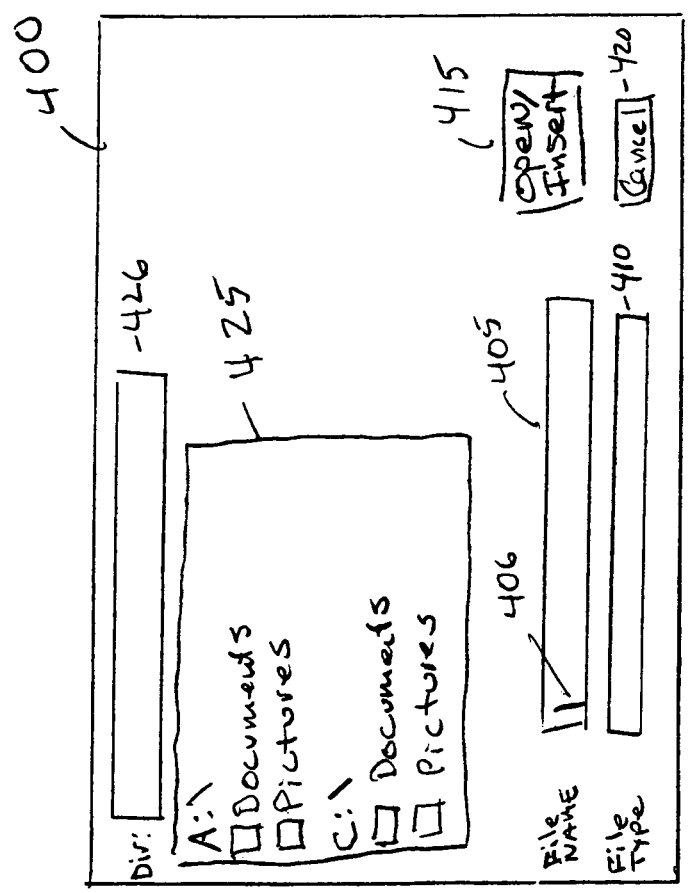
FIG. 4 illustrates the characteristics of a typical dialog box provided by a word processing application for inserting information in a word processing document in accordance with one embodiment of the invention.

FIG. 4 illustrates the characteristics of a typical dialog box provided by a word processing application for inserting information in a word processing document in accordance with one embodiment of the invention. Dialog box 400, shown in FIG. 4, includes a file name edit box 405 having a cursor 406, a file type edit box 410, an open (insert) button 415, a cancel button 420, and a directory list 425 having an associated directory edit box 426. Dialog box 400 has dimensions, typically greater than 100 pixels square.

Referring again to FIG. 3, at operation 320, a profile corresponding to the functionality is created based upon the determined characteristics. The profile may deem some characteristics more relevant than others and may deem some characteristics (e.g., a file name icon and an edit box) critical, while others may serve to enhance the reliability of the profile.

Figure 5:
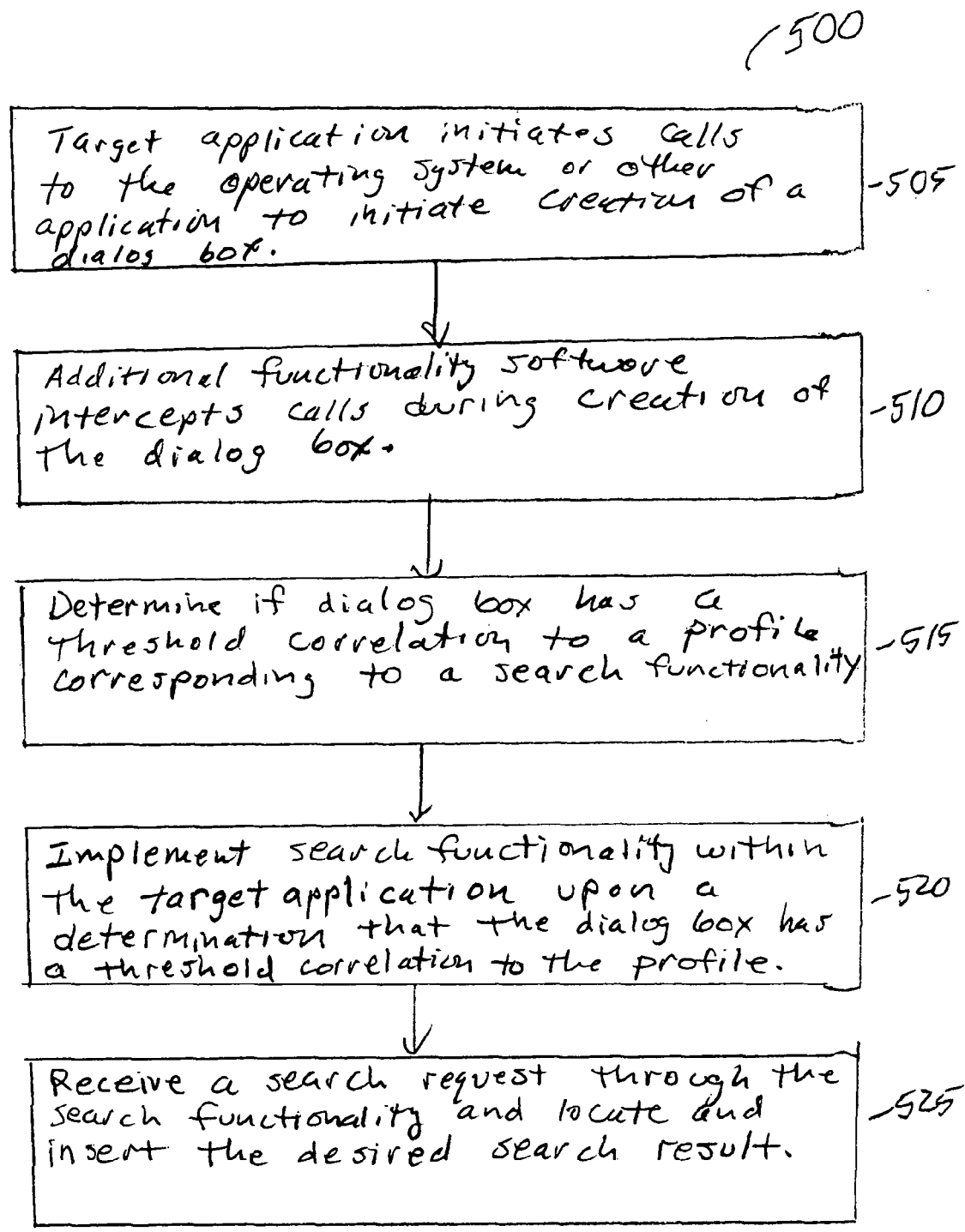
FIG. 5 illustrates a process by which search functionality is implemented within an application in accordance with one embodiment of the invention.

FIG. 5 illustrates a process by which search functionality is implemented within an application in accordance with one embodiment of the invention. Process 500, shown in FIG. 5, begins at operation 505 in which the target application communicates a series of calls to the operating system to initiate the creation of a dialog box.

At operation 510, as the dialog box is being created, the calls to the OS which create the dialog box are intercepted by the AFS. That is, as each component of the dialog box (e.g., insert button, OK button, attach button, etc.) is created, the AFS is monitoring the dialog box creation process.

At operation 515, if the dialog box under construction is determined to have a threshold correlation with the search functionality profile (e.g., as created through process 400, described above in reference to FIG. 4), then the target application is determined to be an application that would benefit from search functionality and search functionality is implemented within the target application. Because the creation of the dialog box is monitored in-progress, a determination to implement search functionality within the target application may be obtained prior to completion of the dialog box.

For one embodiment of the invention a mechanism is provided to avoid falsely determining that an application would benefit from search functionality and, thus, avoid implementing search functionality in an application in which it would not provide a benefit. For one such embodiment, the profile may contain characteristics which if present indicate that search functionality should not be implemented within the target application. Such characteristics may only become evident upon completion of the dialog box. For one embodiment of the invention, therefore, the determination to implement search functionality within the target application is not made until the dialog box creation process is complete.

At operation 520, search functionality is implemented within the target application. The user is provided with a search application that is independent of the target application and without modification to the target application. For example a search functionality interface may appear within the dialog box. In alternative embodiments, the AFS displays its features by manipulating the original application or through interaction with other methods.

At operation 525 a search request is received from a user and the desired search result is incorporated into the product of the target application. For example, the desired search result may be inserted into a word processing document or attached to an e-mail message. For one embodiment of the invention, the AFS automatically accesses the target application and effects incorporation of the desired search result. For example, the AFS automatically presses the insert button or attach button of the dialog box provided by the target application.

Thus embodiments of the invention allow highly effective search functionality to be implemented in applications that do not provide search functionality or provide less effective search capability. For example, typically, search capability provided by word processor applications searches every file on the personal computer for the search term resulting in a significant time to complete the search. In contrast, independent search applications may employ a search index together with specialized search paths and algorithms resulting in a significantly reduced search time.

For one embodiment of the invention, Web search functionality is implemented in the target application. For one such embodiment, the Web search functionality may be in addition to a desktop search functionality.

Figure 6:
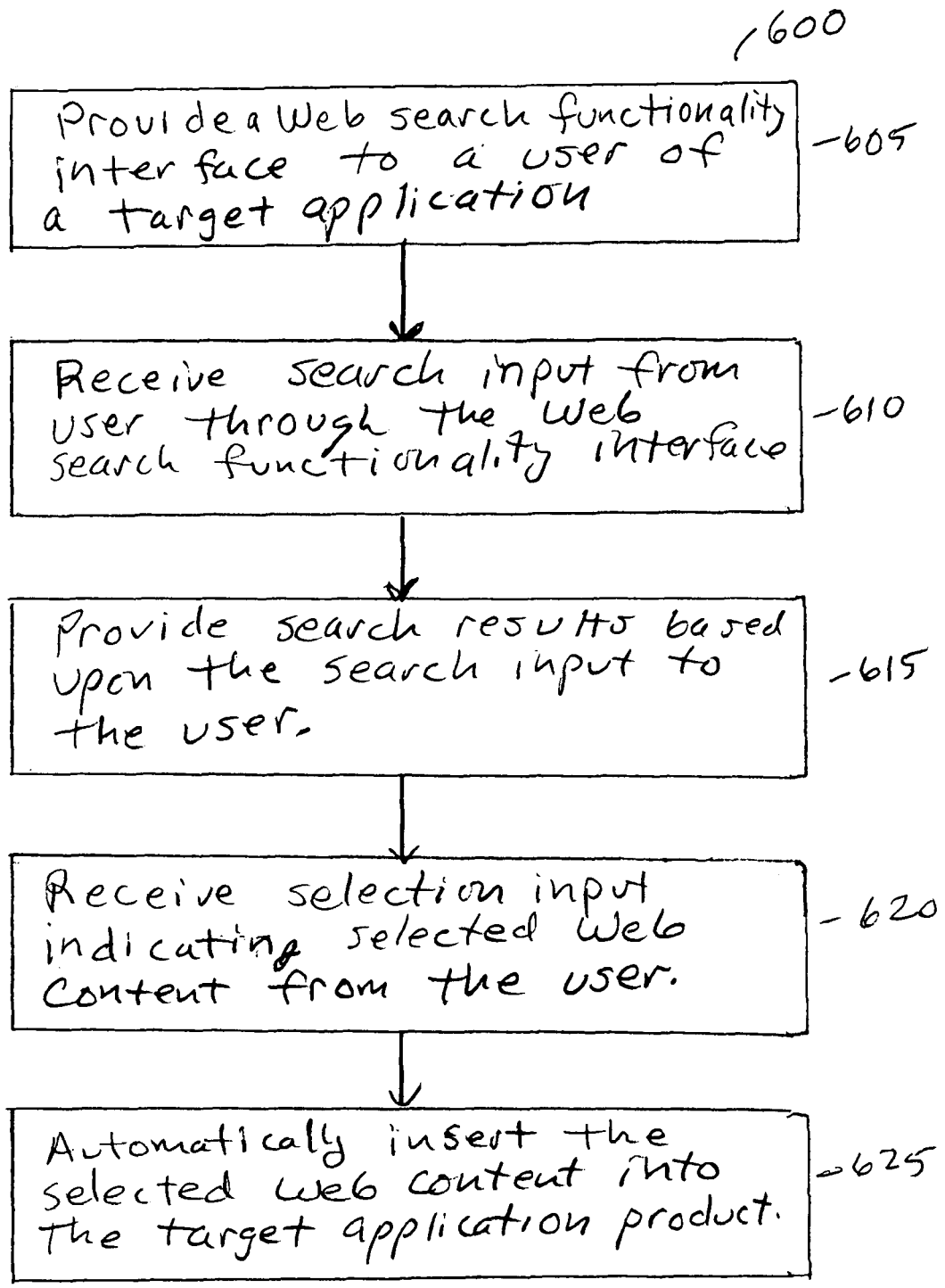
FIG. 6 illustrates a process by which web search functionality is provided to a target application and used in accordance with one embodiment of the invention.

FIG. 6 illustrates a process by which web search functionality is provided to a target application and used in accordance with one embodiment of the invention. Process 600, shown in FIG. 6, begins at operation 605 in which a Web search functionality interface is provided to the user either independently or through the dialog box created by the target application through Web search functionality implemented within the target application. (Note: the determination to implement the Web search functionality within the target application may be effected as described above).

At operation 610, search input is received from the user through the Web search functionality interface. This input may be of various forms depending upon the Web search functionality provided. Exemplary Web search functionality is described in U.S. patent application Ser. No. 10/853,552, entitled "Methods and Systems for Conceptually Organizing and Presenting Information", filed on May 24, 2004.

At operation 615, the Web search functionality provides search results to the user based upon the search input provided by the user. The search results may contain a number of types of information including articles or documents, pictures, audio files, etc., and may include, a web page, data on a web page, attachments to a web page, or other data contained in a storage device.

At operation 620 a selection input is received from the user indicating the desired Web content from among the search results provided.

At operation 625 the selected Web content is automatically inserted into the target application product. For example, the selected Web content may be a picture, which is automatically inserted into a word processing document, or the selected Web content may be a portable document format (PDF) file, which is automatically attached to an e-mail message. For one embodiment of the invention, the AFS automates the process of saving the selected web content to the user's personal computer, locating the saved Web content on the personal computer, and then inserting or attaching the saved content into the target application product.

For example, when the user selects the desired Web content for inserting into a word processing document, the selected content is automatically saved to a temporary file to a designated location on the user's personal computer. The temporary file name and designated location are then input into the appropriate areas of the dialog box of the target application and automatically inserted into the word processing document. This is effected automatically, without interaction between the user, the target application, and the Web search application. Retrieving and inserting Web content is therefore faster and less prone to errors.

General Matters

Embodiments of the invention provide methods and apparatuses for adding functionality to applications without modifying the applications. Embodiments of the invention allow a user of any application that may benefit from a search capability to locate and use information on their personal computer or on the Web through use of an independent search application. Although described for various embodiments in the context of adding search capability to a word processing application or e-mail messaging application, it will be apparent to those skilled in the art that embodiments of the invention are applicable to a wide range of software applications and functionality.

The invention includes various operations. Many of the methods are described in their most basic form, but operations can be added to or deleted from any of the methods without departing from the basic scope of the invention. For example, embodiments of the invention have been described above, in reference to FIG. 1, in which, subsequent to a comparison of intercepted information and a profile in which the intercepted information has a threshold correlation with the profile, functionality is added to the target application. In an alternative embodiment of the invention, the comparison operation is aborted upon attaining the threshold correlation and the functionality is implemented within the target application. Such an embodiment reduces the time between intercepting the information and implementing the functionality within the target application.

In accordance with various alternative embodiments of the invention, some of the operations of the invention may be embodied in machine-executable instructions. Alternatively, the operations may be performed by a combination of hardware and software. Aspects of the invention may be provided as a computer program product that may include a machine-readable medium having stored thereon instructions, which may be used to program a computer (or other electronic devices) to perform a process according to the invention as described above.

Figure 7:
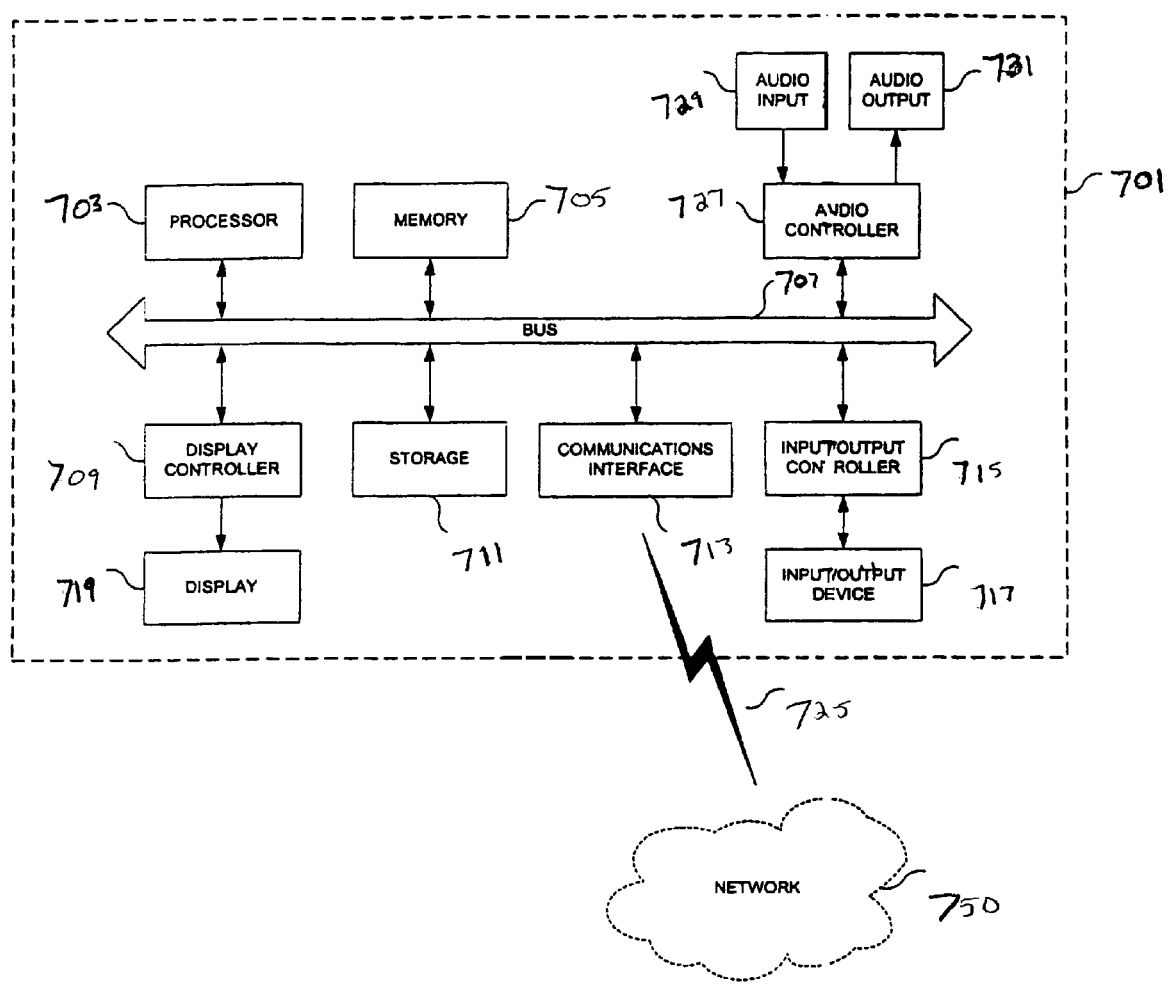
FIG. 7 is a block diagram illustrating a DPS in accordance with various embodiments of the invention.

As described above in reference to FIG. 2, embodiments of the invention may be implemented on a DPS. FIG. 7 is a block diagram illustrating a DPS in accordance with various embodiments of the invention. For alternative embodiments of the present invention, DPS 701, shown in FIG. 7, may be a computer that includes a processor 703 coupled to a bus 707. In one embodiment, memory 705, storage 711, display controller 709, communications interface 713, input/output controller 715 and audio controller 727 are also coupled to bus 707.

DPS 701 interfaces to external systems through communications interface 713. Communications interface 713 may include a radio transceiver compatible with wireless telephone signals or other interfaces for coupling a device to other devices. In one embodiment of the present invention, carrier wave signal 725 is received/transmitted between communications interface 713 and network 750. In one embodiment of the present invention, a carrier wave signal 725 may be used to interface DPS 701 with another computer system, a network hub, router or the like. In one embodiment of the present invention, carrier wave signal 725 is considered to be machine readable media, which may be transmitted through wires, cables, optical fibers or through the atmosphere, or the like.

In one embodiment of the present invention, processor 703 may be a conventional microprocessor, such as for example but not limited to an Intel x86 or Pentium family microprocessor, a Motorola family microprocessor, or the like. Memory 705 may be a machine-readable medium such as dynamic random access memory (DRAM) and may include static random access memory (SRAM). Display controller 709 controls in a conventional manner a display 719, which in one embodiment of the invention may be a cathode ray tube (CRT), a liquid crystal display (LCD), an active matrix display, a television monitor or the like. The input/output device 717 coupled to input/output controller 715 may be a keyboard, disk drive, printer, scanner and other input and output devices (e.g., a mouse). In one embodiment of the present invention, audio controller 727 controls in a conventional manner audio output 731 and audio input 729.

Storage 711 may include machine-readable media such as for example but not limited to a magnetic hard disk, a floppy disk, an optical disk, a smart card or another form of storage for data. In one embodiment of the present invention, storage 711 may include removable media, read-only media, readable/writable media or the like. Some of the data may be written by a direct memory access process into memory 705 during execution of software in computer system 701. It is appreciated that software may reside in storage 711, memory 705 or may be transmitted or received via modem or communications interface 713. For the purposes of the specification, the term "machine readable medium" shall be taken to include any medium that is capable of storing data, information or encoding a sequence of instructions for execution by processor 703 to cause processor 703 to perform the methodologies of the present invention. The term "machine readable medium" shall be taken to include, but is not limited to solid-state memories, optical and magnetic disks, carrier wave signals, and the like.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A computer-implemented method comprising:
creating a profile for an internet search functionality, wherein the profile includes one or more characteristics of a target application that would benefit from the internet search functionality and a beneficial point for implementing the internet search functionality within the target application;
intercepting a call between a target application and another application, wherein the call creates a dialog box within the target application having specified characteristics and the dialog box has a function different than internet search;
determining one or more characteristics of the target application based on the intercepted call;
determining if the one or more characteristics of the target application have a threshold amount of correlation with the characteristics of the profile;
implementing the internet search functionality within the target application when the characteristics of the target application has a threshold degree of correlation with the characteristics of the profile;
providing the implemented internet search functionality to a user via an internet search interface, wherein the search functionally interface is provided via a tile dialog box of the target application;

receiving a search request from the user via the search functionality interface;

conducting an internet search in response to the search request;

presenting a plurality of search results to a user based on the internet search;

receiving a user selection of one of the plurality of search results; and automatically inserting the selected search result into a product of the target application.

2. The computer-implemented method of claim 1 wherein the another application is an operating system.

3. The computer-implemented method of claim 1 wherein a target application that would benefit from the internet search capability includes at least one of a word-processing application and an e-mail messaging application.

4. The computer-implemented method of claim 1 wherein creating the profile for the internet search functionality further comprises:

determining a characteristic of information exchanged between the target application and the other application; and creating a profile based upon the determined characteristics.

5. The computer-implemented method of claim 1 wherein the specified characteristics of the dialog box include at least one of a directory list, a file name edit box having a cursor, a tile type edit box, and a dimension greater than 100 pixels square.

6. The computer-implemented method of claim 5 wherein the specified characteristics of the dialog box further include at least one of an OK button, a cancel button, an insert button, an attach button, and a submit button.

7. The computer-implemented method of claim 1 wherein the internet search functionality employs a search index, a specialized search path, and a specialized algorithm for reducing search time.

8. A machine-readable storage medium containing executable instructions which when executed by a digital process system cause the system to perform a method comprising:

creating a profile for an internet search functionality, wherein the profile includes one or more characteristics of a target application that would benefit from the internet search functionality and a beneficial point for implementing the internet search functionality within the target application;

intercepting a call between a target application and another application, wherein the call creates a dialog box within the target application having specified characteristics;

determining one or more characteristics of the target application based on the intercepted call;

determining if the one or more characteristics of the target application have a threshold amount of correlation with the characteristics of the profile;

implementing the internet search functionality within the target application when the characteristics of the target application has a threshold degree of correlation with the characteristics of the profile;

providing the implemented internet search functionality to a user via an internet search interface, wherein the search functionally interface is provided via a file dialog box of the target application:

receiving a search request from the user via the search functionality interface;

conducting an internet search in response to the search request;

presenting a plurality of search results to a user based on the internet search;

receiving a user selection of one of the plurality of search results; and automatically inserting the selected search result into a product of the target application.

9. The machine-readable storage medium of claim 8 wherein the other application is an operating system.

10. The machine-readable storage medium of claim 8 wherein a target application that would benefit from the internet search capability includes at least one of a word-processing application and an e-mail messaging application.

11. The machine-readable storage medium of claim 8 wherein the profile for the internet search functionality is created through a process comprising:

determining a characteristic of information exchanged between the target application and the other application; and creating a profile based upon the determined characteristics.

12. The machine-readable storage medium of claim 8 wherein the specified characteristics or the dialog box include at least one of a directory list, a file name edit box having a cursor, a file type edit box, and a dimension greater than 100 pixels square.

13. The machine-readable storage medium of claim 12 wherein the specified characteristics of the dialog box further include at least one of an OK button, a cancel button, an insert button, an attach button, and a submit button.

14. The machine-readable storage medium of claim 8 wherein the internet search functionality employs a search index, a specialized search path, and a specialized algorithm for reducing search time.

15. A computer system comprising:

storage;

an application stored in the storage, the application having a file dialog box; and an internet search functionality implemented within the application to provide a search functionality interface to a user, the search functionality interface provided through the file dialog box of the application, receive a search request from a user through the search functionality interface, conduct an internet search in response to the search request, present a plurality of search results to a user based on the internet search, receive a user selection of one of the plurality of search results and automatically insert the selected search result into a product of the application, wherein the internet search functionality implemented within the application comprises creating a profile for the internet search functionality, the profile indicating applications that would benefit from the internet search functionality, wherein the creating the profile for the internet search functionality comprises:

determining a subject application that would benefit from the internet search functionality; and determining the a beneficial point of the subject application, the beneficial point, being a point in the subject application at which the subject application would benefit form the internet search functionality.

16. The computer system of claim 15 wherein the internet search functionality implemented within the application further comprises:

intercepting a call between a target application and another application, wherein the call creates a dialog box within the target application having specified characteristics and the dialog box has a function different than internet search;

determining one or more characteristics of the target application based on the intercepted call;

determining if the one or more characteristics of the target application have a threshold amount of correlation with the characteristics of the profile;

implementing the internet search functionality within the target application when the characteristics of the target application has a threshold degree of correlation with the characteristics of the profile;

providing the implemented internet search functionality to a user via an internet search interface, wherein the search functionality interface is provided via a file dialog box of the target application;

receiving a search request from the user via the search functionality interface;

conducting an internet search in response to the search request;

presenting a plurality of search results to a user based on the internet search;

receiving a user selection of one of the plurality of search results; and automatically inserting the selected search result into a product of the target application.

17. The computer system of claim 16 wherein the second application is an operating system.

18. The computer system of claim 16 wherein a target application that would benefit from the internet search capability includes at least one of a word-processing, application and an e-mail messaging application.

19. The computer system of claim 16 wherein the profile for the internet search functionality is created through a process comprising:

determining a characteristic of information exchanged between the target application and the other application; and creating a profile based upon the determined characteristics.

20. The computer system of claim 19 wherein the specified characteristics of the dialog box include at least one of, a directory list, a tile name edit box having a cursor, a file type edit box, and a dimension greater than 100 pixels square.

21. The computer system of claim 20 wherein the specified characteristics of the dialog box further include at least one of an OK button, a cancel button, an insert button, an attach button, and a submit button.

22. The computer system of claim 15 wherein the internet search functionality employs a search index, a specialized search path, and a specialized algorithm for reducing search time.

* * * * *